US006536544B1

(12) United States Patent
Egawa et al.

(10) Patent No.: US 6,536,544 B1
(45) Date of Patent: Mar. 25, 2003

(54) WALKING AID APPARATUS

(75) Inventors: Saku Egawa, Ibaraki-ken (JP); Atsushi Koseki, Toride (JP); Yasuhiro Nemoto, Ibaraki-ken (JP); Masakatsu G. Fujie, Ushiku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/381,093

(22) PCT Filed: Mar. 17, 1997

(86) PCT No.: PCT/JP97/00837

§ 371 (c)(1), (2), (4) Date: Sep. 15, 1999

(87) PCT Pub. No.: WO98/41182

PCT Pub. Date: Sep. 24, 1998

(51) Int. Cl.$^7$ ..................... B62D 51/04
(52) U.S. Cl. ..................... 180/19.3
(58) Field of Search ..................... 180/19.1, 19.2, 180/19.3; 701/223

(56) References Cited

U.S. PATENT DOCUMENTS

| | | | | | |
|---|---|---|---|---|---|
| 4,113,042 | A | * 9/1978 | Vaiil | | 180/19.3 |
| 4,697,661 | A | * 10/1987 | Pajerski et al. | | 180/6.5 |
| 4,829,844 | A | * 5/1989 | Boomgaarden et al. | | 74/470 |
| 5,036,929 | A | * 8/1991 | Trougouboff | | 180/8.2 |
| 5,053,979 | A | * 10/1991 | Etoh | | 700/304 |
| 5,701,965 | A | * 12/1997 | Kamen et al. | | 180/7.1 |
| 5,729,108 | A | * 3/1998 | Steele | | 318/575 |
| 5,732,786 | A | * 3/1998 | Fujigaki | | 180/19.3 |
| 5,791,425 | A | * 8/1998 | Kamen et al. | | 180/7.1 |
| 5,913,373 | A | * 6/1999 | Forrest | | 180/6.2 |
| 5,927,414 | A | * 7/1999 | Kan et al. | | 180/19.3 |
| 5,971,091 | A | * 10/1999 | Kamen et al. | | 180/218 |
| 5,975,225 | A | * 11/1999 | Kamen et al. | | 180/7.1 |

FOREIGN PATENT DOCUMENTS

| | | |
|---|---|---|
| EP | 0 691 232 A2 | * 1/1996 |
| EP | 0 707 842 A1 | * 4/1996 |
| JP | 5-329186 A | * 12/1993 |
| JP | 6-304204 | * 11/1994 |
| JP | 6-304207 | * 11/1994 |
| JP | 7-75219 A | * 3/1995 |
| JP | 8-47114 A | * 2/1996 |

* cited by examiner

*Primary Examiner*—Robert P. Olszewski
*Assistant Examiner*—Andrew J. Fischer
(74) *Attorney, Agent, or Firm*—Antonelli, Terry, Stout & Kraus, LLP

(57) ABSTRACT

A walking aid apparatus including a movable body and a support unit provided to the movable body to support a user further includes means for reducing a change rate of speed of the movable body with respect to a change in a force applied from the user to the support unit. With this arrangement, even when the user stumbles and applies a strong force to the support unit, the movable body can be prevented from moving suddenly, minimizing the possibility of the user being left behind the movable body.

13 Claims, 8 Drawing Sheets

(A)

(B)

WALKING AID APPARATUS

FIELD OF THE INVENTION

The present invention relates to a walking aid apparatus which comprises a movable body for enabling the apparatus to move and a support unit for supporting a user to aid the user in walking.

BACKGROUND ART

As an apparatus for aiding old people and handicapped people with an impaired walking ability, there is a walking aid apparatus described in JP-A-2-5953, for example. JP-A-2-5953 discloses a walking aid apparatus which comprises a lower frame having a treading space for a user formed on the rear side, universal casters with braking mechanisms attached to the front and rear parts of both left and right sides of the lower frame, and an operation unit for operating the braking mechanisms. As the braking mechanism, JP-A-2-5953 discloses a brake in which when a lever of the operation unit is gripped with one hand, a drive piece arranged near the caster is pivoted about a pivot shaft to abut against the upper end of an actuating rod, pushing down the actuating rod, which in turn presses a braking piece, which has a friction surface for contact with a wheel, against the wheel to render the turning and traveling of the wheel impossible.

JP-A-5-329186 discloses a walking aid apparatus which comprises a movable body for aiding a user to walk, a support unit for supporting the weight of the user, and a detector for detecting a force acting in a direction in which the user is walking, wherein a detected value from the detector is compared with its target value to control the movement of the movable body. JP-A-5-329186 also discloses control means which comprises left and right setters for setting target force values, left and right comparators for comparing the target force values and the detected force values from the force detector, scale multipliers for amplifying differential values from these comparators; and adders for adding the amplified differential values from the scale multipliers and the target force values from the setters. JP-A-5-329186 describes that the use of this control means allows the user to push the walking aid apparatus with a constant force at all times regardless of the mass of the apparatus and an inclination of a road.

The walking aid apparatus described in JP-A-2-5953 is the one which is pushed only by the user himself. In such a push-type walking aid apparatus, when the user stumbles, he is likely to strongly push the apparatus forward and may be left behind.

In this case, although it is possible that the user may grip the lever on the operation unit to brake the apparatus by the manual braking mechanism, it may be difficult for the user, who is old or handicapped, to operate the brake. When the user stumbles or the apparatus is used on a slope, he or she may not be able to apply brake quick enough. This type of apparatus therefore demands improvement in terms of operability.

While some resistance may be applied to the wheels at all times to make the aid apparatus difficult to move and thereby eliminate the possibility of the user getting left behind, the user needs to push the apparatus with a stronger force at all times, which obviously makes the apparatus difficult to handle.

In a walking aid apparatus which performs the movement control based on the force applied to the apparatus from the user, like the one described in JP-A-5-329186, when the user stumbles and applies a strong push to the apparatus, the movement of the apparatus is controlled so that the apparatus moves greatly according to the strong force applied inadvertently by the user, with the result that the user may get left behind.

Further, in this walking aid apparatus, the user can push the apparatus on a horizontal or sloped surface with a desired constant force Uref by setting that force in the apparatus. When the force Uref set in the walking aid apparatus is set at "0", it is possible to stop the walking aid apparatus even when the force applied to the apparatus on the sloped surface is rendered "0", i.e., the user releases his hand from the apparatus.

However, the user may lean on the apparatus to reduce the burden on his legs or to keep his balance. In that case, the apparatus is applied with a force acting vertically and downwardly. If such a force is applied to the apparatus on the sloped surface, the force detector detects a force which is equivalent to one that tends to push the apparatus downwardly along the sloped surface. Hence, the apparatus is controlled to move down the sloped surface, so that the user may be left behind.

What is described above also applies to the case where the user is walking. When the user walks leaning on the apparatus, a vertically downward force acts on the apparatus which is then controlled to move down based on a force which is larger in magnitude than the user recognizes, so that the user may be left behind.

DISCLOSURE OF THE INVENTION

The conventional apparatuses, however, do not consider automatic application of brake regardless of the operation on the part of the user in the above-mentioned case. It is therefore an object of the present invention to provide a safe walking aid apparatus which prevents such a phenomenon that the apparatus moves or is performed the movement control with a force applied inadvertently to the apparatus by the user and thus the user is left behind.

To achieve the above object, a walking aid apparatus according to the present invention comprises a movable body and a support unit provided to the movable body, and further comprises means for reducing a change rate of a speed of the movable body with respect to a change in force acting on the support unit when the speed of the movable body increases.

A walking aid apparatus of the present invention comprises a movable body, a support unit provided to the movable body, and a controller for controlling movement of the movable body, and further comprises force detection means for detecting a force acting on the support unit, and control means for reducing, based on a detection result in the force detection means, a change rate of a speed of the movable body with respect to a change in force acting on the support unit when the speed of the movable body increases.

A walking aid apparatus of the present invention comprises a movable body and a support unit provided to the movable body, and further comprises resistance application means for increasing a resistance applied to the movable body when a speed of the movable body increases.

In these walking aid apparatus, it is more difficult to increase the speed of the apparatus when the moving speed is high than when the moving speed is low. Hence, even when the user stumbles and applies a strong force to the support unit, the movable body can be prevented from moving suddenly, thus minimizing the possibility of the user getting left behind the apparatus. When the apparatus is moving at slow speed, it can be moved easily with a small force, thus facilitating the handling.

Further, a walking aid apparatus of the present invention comprises a movable body, a support unit provided to the movable body, and a controller for controlling movement of the movable body, and further comprises control means for detecting a force acting on the support unit to control a change rate of an acceleration with respect to a change in the force, wherein the control means is adapted to make the change rate during acceleration smaller than that during the deceleration.

A walking aid apparatus of the present invention comprises a movable body, a support unit provided to the movable body, and a controller for controlling movement of the movable body based on a force applied to the movable body, wherein an absolute value of an acceleration when a force is applied in a direction in which the movable body is accelerated is made smaller than an absolute value of an acceleration when the same force is applied in a direction in which the movable body is decelerated.

In these walking aid apparatus, although the acceleration performance is set low to forestall a situation where the movable body is suddenly moved forward leaving the user behind, a high deceleration performance can be obtained. Therefore, even when the user stops suddenly for some reason, the apparatus can be stopped quickly, thus preventing the user from being left behind.

Furthermore, a walking aid apparatus of the present invention comprises a movable body, a support unit provided to the movable body, and a controller for controlling movement of the movable body based on a force applied to the movable body, and further comprises inclination angle detection means for detecting an inclination angle of the movable body, wherein a movement control of the movable body is corrected based on an output of the inclination angle detection means so as to eliminate an influence of a vertical component of a force applied to the movable body.

A walking aid apparatus of the present invention comprises a movable body, a support unit provided to the movable body, and a controller for controlling movement of the movable body based on a force applied to the movable body, wherein a movement control is performed so that even when a vertical force is applied to the movable body on a slope with no horizontal force applied, the movable body remains at its position.

On a slope, the longitudinal force components are produced by the vertical force applied to the movable body from the user, so that the movement control of the movable body is performed based on the longitudinal force components. Generally, the vertical force applied to the movable body from the user is not intended to move the apparatus. Thus, removing the influences of this component of force from the movement control of the movable body makes it possible to prevent unwanted movement of the movable body, thereby forestalling a situation where the user may get left behind the apparatus.

In the above apparatus, the force applied to the movable body from the user should be detected preferably by detecting with force detection means a force applied to the support unit from the user.

Furthermore, a walking aid apparatus of the present invention comprises a movable body, a support unit provided to the movable body, and a controller for controlling movement of the movable body, and further comprises means for stopping the movable body when the means detects that the movable body moves back and comes within a predetermined distance to an object.

In this walking aid apparatus, even when the user applies a backward force to the support unit unconsciously, the movable body can be stopped moving back before reaching the user.

As described above, the present invention can forestall a situation where the user may be left behind the walking aid apparatus.

In the foregoing description, the speed increase of the movable body means to increase the speed of the movable body either in the forward or backward direction.

BEST MODE FOR IMPLEMENTING THE INVENTION

In the event that a user stumbles, the conventional walking aid apparatus follows a sequence of events described below, leaving behind the user and, in the worst case, resulting in the user falling down.

(1) The user loses his or her balance for some reason or other such as stumbling.

(2) Upon stumbling, the user strongly pushes the walking aid-apparatus forward or leans on the apparatus to prevent himself from falling.

(3) The walking aid apparatus receives a strong horizontal force from the user. As the weight of the user bears on it, the walking aid apparatus also receives a strong vertical force.

(4) The walking aid apparatus quickly accelerates with a large acceleration.

(5) The walking aid apparatus has a large speed in a short time.

(6) The user cannot cope with the motion of the walking aid apparatus to further lose his balance and to fall down.

A walking aid apparatus of the present invention controls the acceleration and speed of the walking aid apparatus to limit the progress of the above sequence of events and thereby prevent the user from falling down, thus assuring safe walking.

Figure 1:
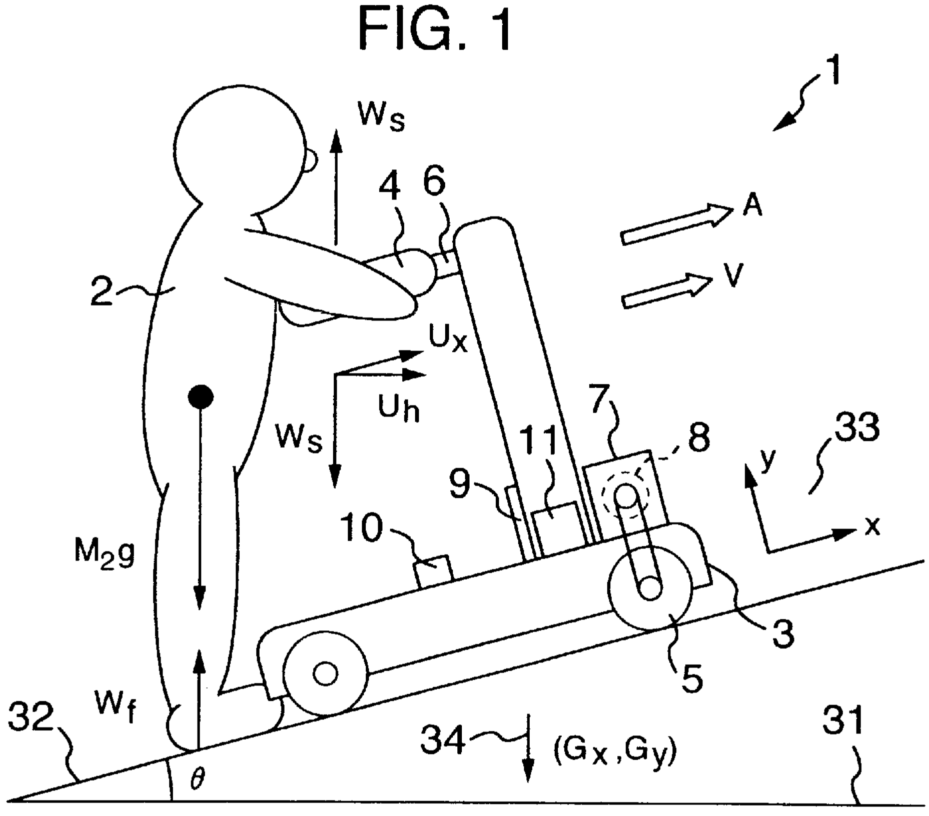
FIG. 1 is a side view and a top view showing the construction of one embodiment of a walking aid apparatus according to the present invention.
Figure 1:
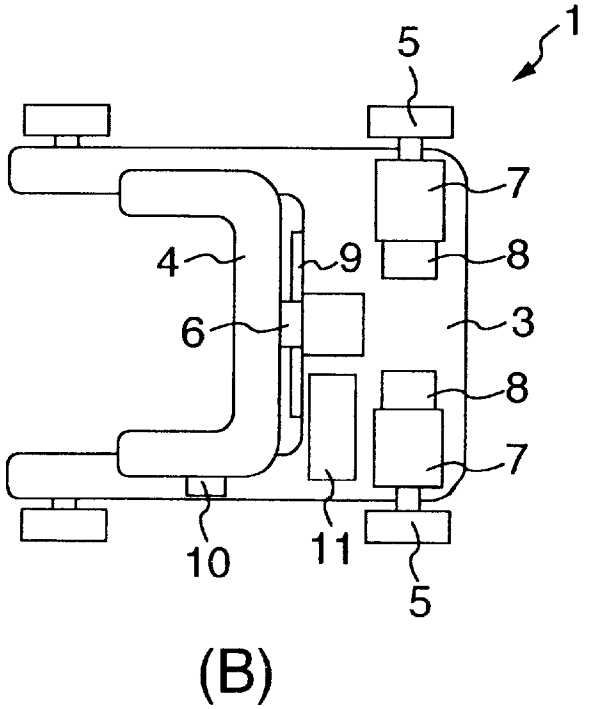

FIG. 1 shows the construction of a walking aid apparatus of the present invention. A walking aid apparatus 1 has a movable body 3 which is movable by wheels 5, and a support unit 4 for supporting a user 2. The support unit 4 is mounted to the movable body 3 and moves together with the movable body 3. The wheels 5 are connected to left and right motors 7 as drive means. The walking aid apparatus 1 can be moved forward or backward or turned by operating the motors 7.

The walking aid apparatus 1 also includes a force sensor 6 as force detection means to detect at least longitudinal and vertical forces and a moment about a vertical axis, which are applied to the movable body 3 or the apparatus from the user 2 through the support unit 4; a speed sensor 8 as speed detection means to detect the speed of the movable body 3; and an inclination sensor 10 as inclination angle detection means to detect the inclination angle of the movable body 3 in at least the longitudinal direction. The walking aid, apparatus 1 also includes a proximity sensor 9 as approach detection means to detect whether or not the user 2 contacts or approaches other than the support unit 4.

The longitudinal direction of the walking aid apparatus 1 is a direction along the plane where the walking aid apparatus 1 is placed, and the vertical direction is a direction perpendicular to this plane.

By supporting the user 2 with the support unit 4 and by controlling the speed or torque of the motors 7 according to the outputs of the force sensor 6, speed sensor 8, inclination sensor 10 and proximity sensor 9 to control the speed V and acceleration A of the walking aid apparatus 1 with a controller 11, the user 2 is prevented from falling and is aided in walking.

Figure 2:
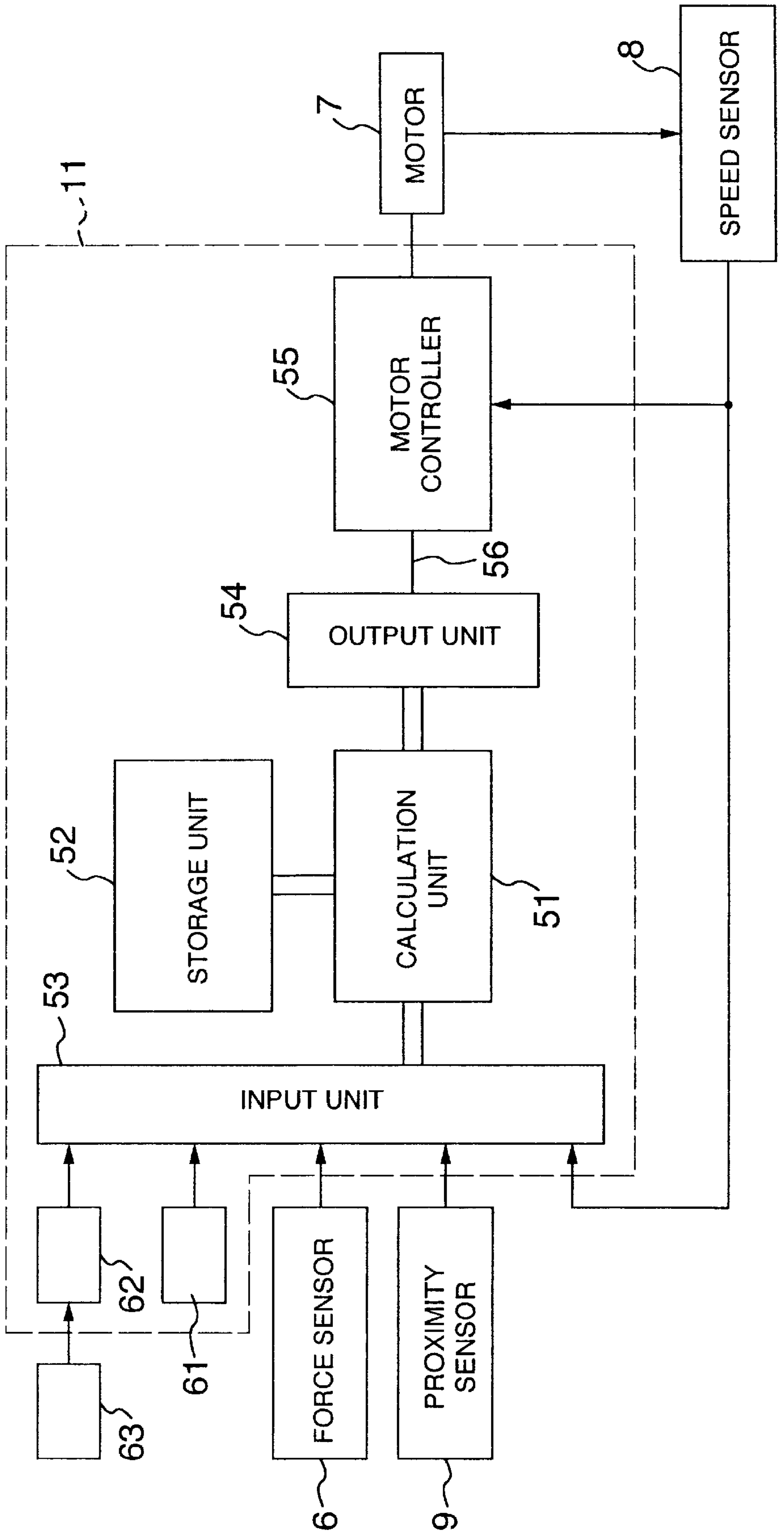
FIG. 2 is a block diagram showing the configuration of one embodiment of a controller according to the present invention.

FIG. 2 is a block diagram showing the configuration of the controller 11 in the walking aid apparatus of the present invention. The outputs of the force sensor 6, speed sensor 8 and proximity sensor 9 are input to a calculation unit 51 through an input unit 53. The calculation unit 51 uses programs and parameters stored in a storage unit 52 to calculate the speed which the motors 7 should generate, and transmits a speed instruction 56 to a motor controller 55 through an output unit 54. In driving the wheels 5, the motor controller 55 controls the motors 7 so that the speed of the motor detected by the speed sensor 8 coincides with the speed instruction 56.

Actually, one pair of the motor 7 and the speed sensor 8 is provided on the left side of the apparatus and another pair of the motor 7 and the speed sensor 8 is provided on the right side of the apparatus. However, when the operation of the apparatus in the longitudinal direction is to be controlled, the motors on the left and right sides are controlled in the same way. Thus, the two motors are represented as one motor.

The parameters stored in the storage unit 52 can be set according to the walking ability of the user by the user or caretaker operating an input device 61 such as a keyboard. The user may possess a recorded medium 63 such as a floppy disk and IC card, in which parameters suited for the owner are recorded, and insert it into a reader 62 to set the parameters.

Figure 3:
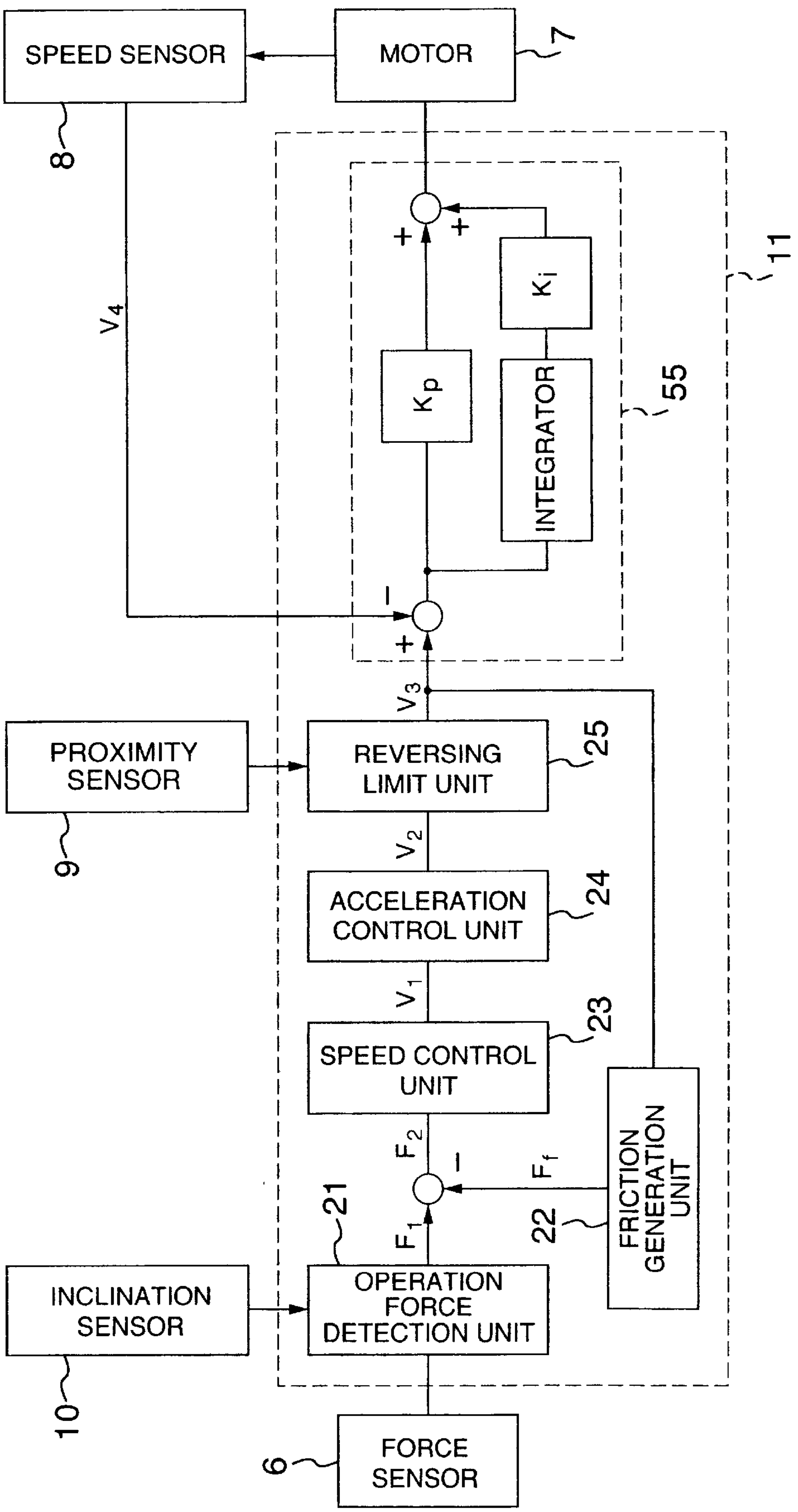
FIG. 3 is a block diagram showing the configuration of one embodiment of a control system according to the present invention.

FIG. 3 is a block diagram showing the operation of the controller 11 of the walking aid apparatus according to the present invention. Of the elements in the controller 11, those other than the motor controller 55 are actually implemented by the calculation unit 51 using the programs stored in the storage unit 52.

First, the force sensor 6 detects the longitudinal and vertical components of the force applied from the user 2 onto the walking aid apparatus 1.

An operation force detection unit 21 uses the output of the inclination sensor 10, i.e., the inclination-angle of the walking aid apparatus 1 in the longitudinal direction, to remove the longitudinal components of the force acting in the gravity direction from the longitudinal component of the output of the force sensor 6 and thereby isolate a longitudinal operation force $F_1$. The following control is performed based on the operation force $F_1$, so that when the weight of the user 2 is applied to the walking aid apparatus 1 on a slope, the operation force is detected to prevent the walking aid apparatus 1 from moving.

A friction generation unit 22 generates a friction force $F_f$ according to the speed and operation direction of the walking aid apparatus 1, and subtracts the operation force $F_1$ from the friction force $F_f$ to determine an effective operation force $F_2$. This prevents the walking aid apparatus 1 from moving inadvertently when a small force is applied or when there are errors in the force sensor 6.

A speed control unit 23 determines a target value $V_1$ of the speed of the movable body 3 according to the effective operation force $F_2$. The speed control unit 23 is so set that the target speed $V_1$ becomes more difficult to be increased as the effective operation force $F_2$ increases, thus preventing the speed V of the walking aid apparatus 1 from becoming excessively large.

An acceleration control unit 24 limits the time change rate of a speed instruction $V_2$ and at the same time makes the speed instruction $V_2$ follow the target speed $V_1$. Thereby, the acceleration A of the walking aid apparatus 1 is limited. Further, by making the change rate of the acceleration A with respect to a change in the operation force $F_1$ during acceleration smaller than during deceleration, the walking aid apparatus 1 can be prevented from being accelerated suddenly. Also, when the walking aid apparatus 1 is to be stopped, it can be decelerated swiftly.

A reversing limit unit 25 normally outputs the speed instruction $V_2$ as a motor speed instruction $V_3$. When the proximity sensor 9 detects that the user 2 contacts or approaches other than the support unit 4 of the walking aid apparatus 1 and when the speed in the reverse direction is given as the speed instruction $V_2$, the reversing limit unit 25 produces a zero output as the motor speed instruction $V_3$ to stop the walking aid apparatus. Thereby, the user 2 is prevented from falling due to contact with the walking aid apparatus 1.

A motor controller 55 compares the motor speed instruction $V_3$ and the output of the speed sensor 8, and multiplies a deviation with a gain $K_p$ and its integration value with a gain $K_i$ to drive the motor 7 so that a motor speed $V_4$ coincides with the instruction value $V_3$. As the walking aid apparatus 1 is driven by the wheels 5 connected to the motors 7, the speed V of the walking aid apparatus 1 coincides with the motor speed $V_4$. As the integration of the deviations between the motor speed instruction $V_3$ and the motor speed $V_4$ is fed back in the motor controller 55, the walking aid apparatus 1 operates according to the motor speed instruction $V_3$ without any accumulated errors. For example, even when the walking aid apparatus 1 is placed on a slope and applied with a force, with which the walking aid apparatus 1 moves, due to gravity, the setting of the motor speed instruction $V_3$ to "0" generates a torque that cancels the effect of gravity and thus stops the walking aid apparatus 1.

The operation of the operation force detection unit 21 is explained by referring to FIG. 1. Suppose that on a slope 32 with an inclination angle θ, the user 2 puts a part of his weight on the support unit 4 of the walking aid apparatus 1 and, while receiving a standing aid force $W_s$ in the vertical upward direction, is pushing the walking aid apparatus 1 with a horizontal forward force $U_h$. In this case, if the mass of the user 2 is $M_2$, the force $W_f$ in the vertical direction acting on the legs of the user 2 is given by the following equation.

$$W_f = M_2 g - W_s \quad (1)$$

The burden acting on the legs of the user 2 decreases as the standing aid force $W_s$ increases.

The support unit 4 is applied with a horizontal forward force $U_h$ from the user 2 and with a reactionary force $W_s$ of the standing aid force in the vertical downward direction. On the other hand, as the force sensor 6 for detecting the force acting on the support unit 4 is mounted on the walking aid apparatus 1, it detects the components along x- and y-axis of a coordinate system 33 fixed to the walking aid apparatus 1. The x-axis is parallel to the slope 32 and the y-axis is parallel to a direction perpendicular to the slope 32. Hence, the forward force $U_h$ and the standing aid reactionary force $W_s$ are detected in combination. That is, if the components of the detected value are $F_x$ and $F_y$, then they are represented by the following equations.

$$F_x = U_h \cdot \cos\theta - W_s \cdot \sin\theta \quad (2)$$

$$F_y = -U_h \cdot \sin\theta - W_s \cdot \cos\theta \quad (3)$$

Here, it is assumed that the speed of the walking aid apparatus 1 is controlled using the detection value $F_x$ in the longitudinal direction of the walking aid apparatus 1 detected by the force sensor 6.

In the case of $\theta>0$, i.e., up slope: When the user 2 puts a part of his weight on the walking aid apparatus 1 and receives the standing aid force $W_s$, then a negative value of $-W_s \cdot \sin\theta$ is added to $F_x$. This produces the same effect as pulling the walking aid apparatus 1 backward, so that the walking aid apparatus 1 will move backward even when no forward force $U_h$ is applied. Further, as the user pushes the apparatus up the slope, a large forward force $U_h$ is necessary.

In the case of $\theta<0$, i.e., down slope: The same effect is produced as pushing the walking aid apparatus 1 forward, so that the walking aid apparatus 1 moves forward even when no forward force $U_h$ is applied. When the apparatus moves forward down the slope, it is necessary to apply a backward force to prevent the speed from becoming excessive. When the user 2 loses his balance and heavily leans on the walking aid apparatus 1, the apparatus may suddenly move forward to leave the user 2 behind. In the worse case, the user 2 may fall down.

In the walking aid apparatus of the present embodiment, the inclination angle θ is detected by the inclination sensor 10 and the following calculations are performed on the outputs $F_x$ and $F_y$ of the force sensor 6 by the operation force detector 21 to eliminate the vertical component and isolate and determine only the horizontal component. This eliminates the influences of the standing aid reactionary force $W_s$ and thereby solves the problem described above.

In the coordinate system 33 fixed to the walking aid apparatus 1, the operation force detection unit 21 calculates the components $G_x$ and $G_y$ of a unit vector 34 acting in the direction of gravity according to the following equations based on the inclination angle θ detected by the inclination sensor 10.

$$G_x = -\sin\theta \quad (4)$$

$$G_y = -\cos\theta \quad (5)$$

Next, from the following equations using $G_x$ and $G_y$, the components $U_x$ and $U_y$ of the horizontal forward force $U_h$ in the coordinate system 33 are determined by removing the components parallel to $G_x$ and $G_y$ from the detection values $F_x$ and $F_y$ of the force sensor.

$$U_x = F_x - (F_x \cdot G_x + F_y \cdot G_y) G_x \quad (6)$$

$$U_y = F_y - (F_x \cdot G_x + F_y \cdot G_y) G_y \quad (7)$$

Substituting the components of $F_x$ and $F_y$ into the above equations results in the following equations.

$$U_x = U_h \cdot \cos\theta \quad (8)$$

$$U_y = -U_h \cdot \sin\theta \quad (9)$$

It can be confirmed that the influence of the standing aid force $W_s$ is eliminated to detect only the component of the forward force $U_h$.

By the above calculation, the operation force detection unit 21 extracts and detects the forward force $U_h$ and outputs the longitudinal component $U_x$ for the walking aid apparatus 1 as the operation force $F_1$. As the walking aid apparatus 1 is controlled according to the operation force $F_1$, the operation of the walking aid apparatus 1 is not affected even when the user 2 leans on the walking aid apparatus 1 on the slope.

For example, when the user 2 puts a part of his weight on the walking aid apparatus 1 and receives the standing aid force $W_s$ without applying the forward force $U_h$, $F_1$ becomes "0". As a result, the motor speed instruction $V_3$ becomes "0", so that the walking aid apparatus 1 does not move. At this time, as the walking aid apparatus 1 receives the standing aid reactionary force $W_s$ acting in the vertical downward direction and the gravity-acting on the mass of the walking aid apparatus 1, a force is acting on the apparatus to move it down the slope. However, the motor controller 55 generates a torque that cancels the external force, thus keeping the walking aid apparatus 1 at rest.

When the user 2 walks up or down the slope while putting a part of his weight on the walking aid apparatus 1, he can walk easily without being influenced by that portion of his weight carried by the apparatus. Further, even when the user loses his balance while walking on a down slope and heavily leans on the walking aid apparatus 1, the walking aid apparatus 1 is not influenced by the vertical component of the force, so that the movement of the walking aid apparatus 1 is restricted. As a result, the fear that the user may be left behind the walking aid apparatus 1 is eliminated, and also the risk of his falling is reduced.

The friction generation unit 22 generates a friction force $F_f$ based on the operation force $F_1$ and the motor speed instruction $V_3$. When the walking aid apparatus 1 is at rest, the friction generation unit 22 generates a static friction as the friction force $F_f$. That is, when the operation force $F_1$ is equal to or less than a friction setting value $F_{f0}$, $F_f$ and $F_1$ are balanced. When $F_1$ is in excess of $F_{f0}$, the magnitude of $F_f$ is limited to $F_{f0}$. When the walking aid apparatus 1 is in motion, the magnitude of $F_f$ is set to $F_{f0}$ and its sign is determined so as to hinder any speed increase.

As the speed V of the walking aid apparatus 1 is controlled by the motor speed instruction $V_3$, the speed and operation direction of the walking aid apparatus 1 can be judged from the magnitude and sign of the motor speed instruction $V_3$. That is, when the magnitude of the motor speed instruction $V_3$ is equal to or less than a sufficiently small value $V_{min}$, the walking aid apparatus 1 can be regarded as being stationary. When $V_3$ is a positive value larger than $V_{min}$, the walking aid apparatus 1 can be decided as moving forward. When $V_3$ is a negative value smaller than $-V_{min}$, the walking aid apparatus 1 can be regarded as moving backward. Here, $V_{min}$ is a small value such that the user 2 feels as if the walking aid apparatus 1 is at rest, and should preferably be set equal to or less than 1 cm/s.

What is described above may be expressed by the following equations.

$$F_f = F_1 (\text{when } |V_3| \leq V_{min}, |F_1| \leq F_{f0}) \quad (10)$$

$$F_f = F_{f0} (\text{when } |V_3| \leq V_{min}, F_1 > F_{f0}) \quad (11)$$

$$F_f = -F_{f0} (\text{when } |V_3| \leq V_{min}, F_1 < -F_{f0}) \quad (12)$$

$$F_f = F_{f0} (\text{when } V_3 > V_{min}) \quad (13)$$

$$F_f = -F_{f0} (\text{when } V_3 < -V_{min}) \quad (14)$$

The effective operation force $F_2$ is determined by subtracting the friction force $F_f$ from the operation force $F_1$ and the speed of the walking aid apparatus 1 is controlled according to $F_2$, so that the user 2 feels as if the friction force $F_f$ is acting on the walking aid apparatus 1. This prevents the walking aid apparatus 1 from moving inadvertently when the user 2 unintentionally applies a slight force to the walking aid apparatus 1 or when there are some errors in the force sensor 6. The friction setting value $F_{f0}$ will become a burden for the user 2 when it is set at an excessively large value. Thus, the value should be desirably set to a small value in a range that can prevent inadvertent movement. The value is preferably set to 0.5 N or less.

Figure 4:
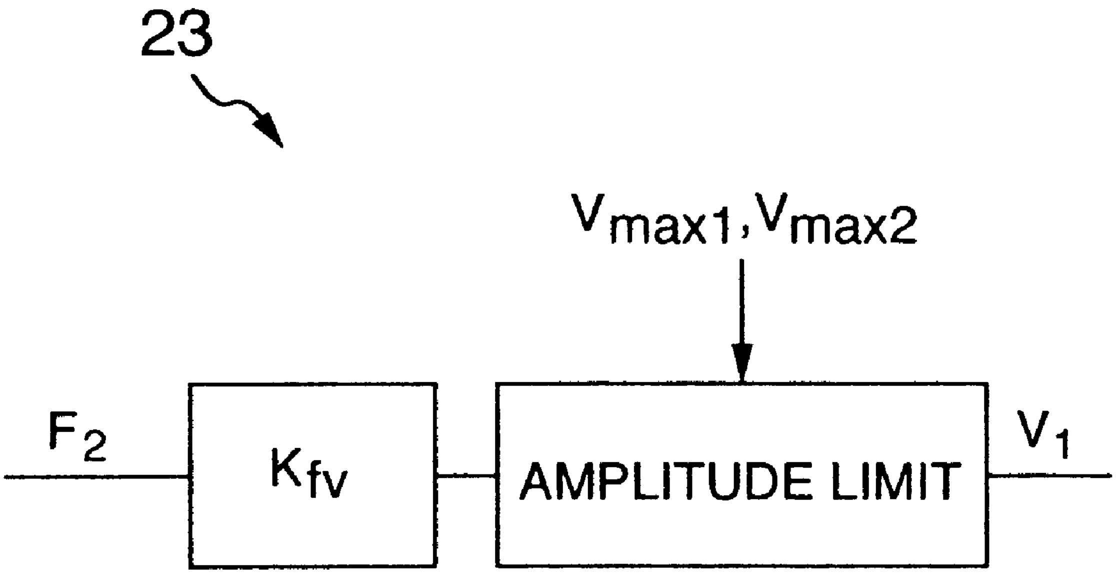
FIG. 4 is a block diagram showing the inner configuration of one embodiment of a speed control unit according to the present invention.

FIG. 4 is a block diagram showing the inner configuration of the speed control unit 23. The speed control unit 23 determines a target speed by multiplying the effective operation force $F_2$ by a gain $K_{fv}$ and then limits it to a range from $-V_{max2}$ to $V_{max2}$ before outputting it as the target speed $V_1$. This operation is expressed by equations as follows.

$$V_1 = K_{fv} \cdot F_2 (\text{when } -V_{max2} \leq K_{fv} \cdot F_{F2} \leq V_{max1}) \quad (15)$$

$$V_1 = V_{max1} (\text{when } K_{fv} \cdot F_2 > V_{max1}) \quad (16)$$

$$V_1 = -V_{max2} (\text{when } K_{fv} F_2 < -V_{max2}) \quad (17)$$

The speed V of the walking aid apparatus 1 is controlled according to the target speed $V_1$. The relation between the operation force $F_1$ and the target speed $V_1$, i.e., the relation between the operation force $F_1$ and the speed V, when the speed V coincides with the target speed $V_1$ is represented by the solid line in the graph of FIG. 5. As the friction force $F_f$ is acting, the speed V is kept at "0" when the absolute value of the operation force $F_1$ is equal to or less than the friction setting value $F_{f0}$. When the user 2 applies a forward force to the walking aid apparatus 1 to generate a positive operation force $F_1$ and $F_1$ exceeds $F_{f0}$, the speed V increases according to the operation force $F_1$. However, when the speed reaches the speed limit value $V_{max1}$, the speed stops increasing. Therefore, even if a strong force is applied to the walking aid apparatus 1 as when the user 2 stumbles, the speed V is prevented from becoming excessively large.

Further, when the user 2 applies a backward force to the walking aid apparatus 1 to generate a negative operation force $F_1$, the speed V is similarly limited to $-V_{max2}$. This prevents the user 2 from falling backward.

The speed limit values $V_{max1}$ and $V_{max2}$ can be set according to the walking ability of the user 2. Considering the fact that the backward walking is more difficult than the forward walking and produces a greater risk of the user falling down, $V_{max2}$ may be set smaller than $V_{max1}$. Preferably, $V_{max1}$ should be set at 1 m/s or less and $V_{max2}$ at 0.5 m/s or less.

The maximum values such as $V_{max1}$ and $V_{max2}$ may not necessarily be determined, and there may be cases where the object can be accomplished by suppressing the speed increase with respect to an increase in force.

Figure 5:
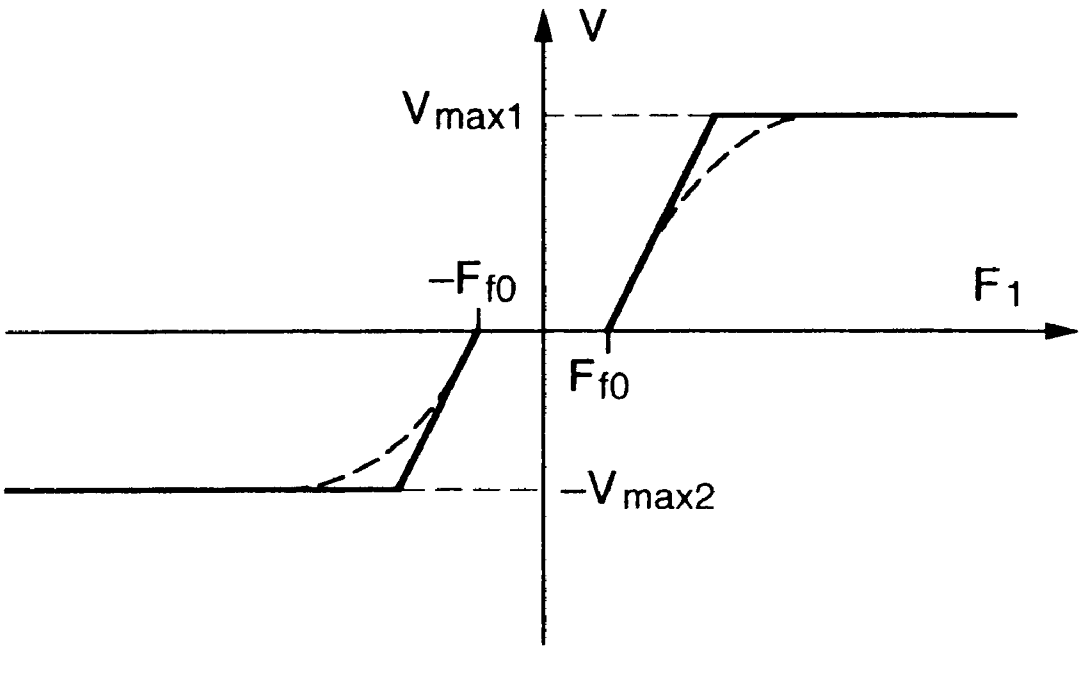
FIG. 5 is a graph showing an example relationship between an operation force and a speed of a walking aid apparatus according to the present invention.

While in the example of FIG. 5 the relation between the operation force $F_1$ and the target speed $V_1$ is represented by a solid bent line, it is possible to set the relation so that it can be represented by a smooth curve of a dashed line. In this case, in order to produce the fall prevention effect described above, the change rate of the speed with respect to the change in force needs to decrease as the absolute value of $F_1$ increases. That is, the inclination of the line is reduced as the absolute value of $F_1$ increases. The target speed $V_1$ can be determined based on $F_1$ using a smooth function that satisfies the above conditions. For example, $V_1$ may be made proportional to the cubic root of $F_1$. Further, a number table may be stored in the storage unit 52 and referenced to determine the $V_1$ based on $F_1$.

With this arrangement, as the operation force $F_1$ increases, the change rate of the speed with respect to the change in force decreases continuously, so that the speed of the apparatus can be limited to enhance safety without making the user 2 feel incongruous. On the other hand, when the normal walking is maintained with a small force, the speed V of the apparatus changes sufficiently greatly according to the operation force $F_1$, so that the user 2 can walk easily without receiving a large resistance.

Figure 6:
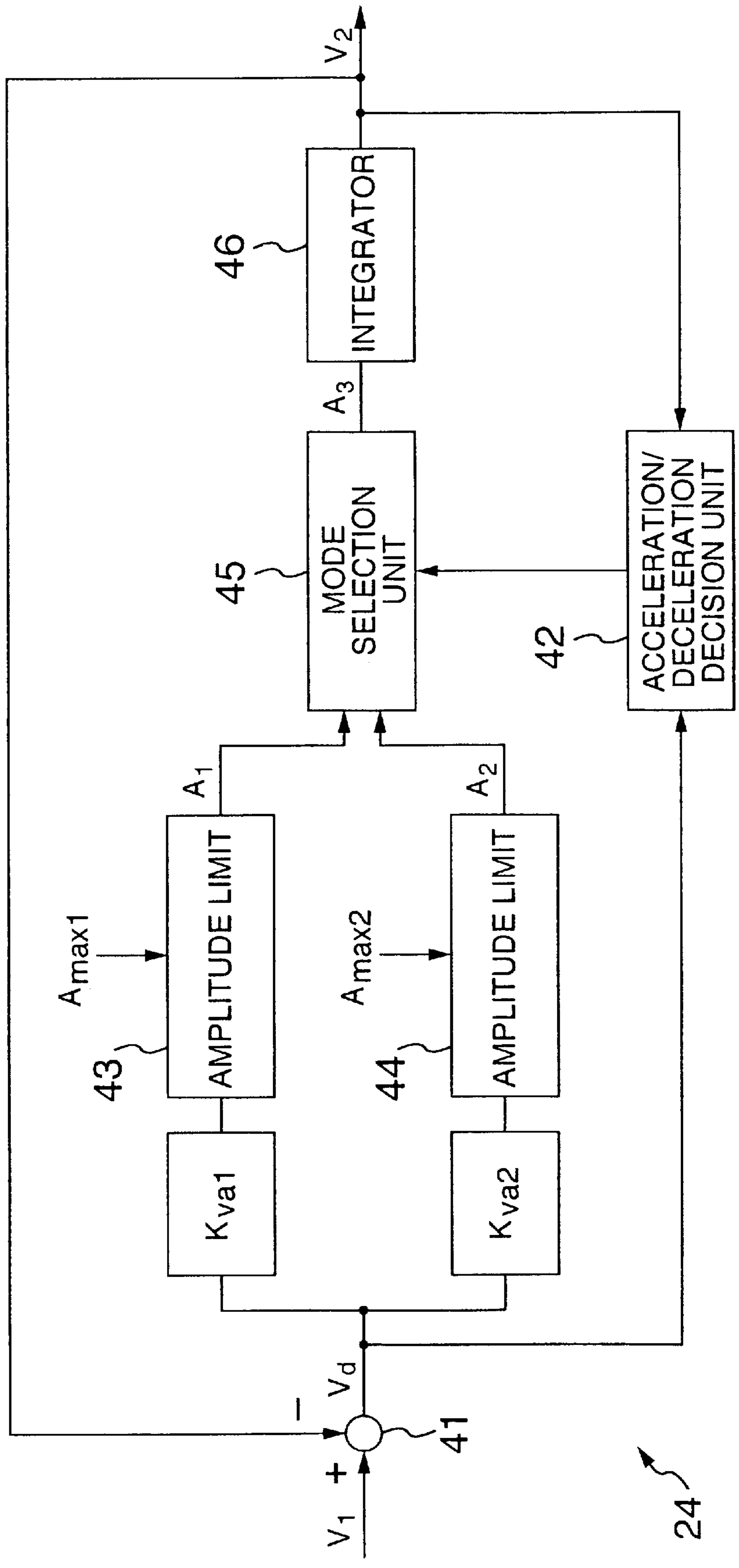
FIG. 6 is a block diagram showing the inner configuration of one embodiment of an acceleration control unit according to the present invention.

FIG. 6 is a block diagram showing the internal configuration of the acceleration control unit 24. The acceleration control unit 24 limits the time change rate of the speed instruction $V_2$ and at the same time makes the speed instruction $V_2$ follow the target speed $V_1$. Thereby, the acceleration of the walking aid apparatus 1 is limited.

An acceleration instruction Al is determined by determining a deviation $V_d$ between the target speed $V_1$ and the speed instruction $V_2$, multiplying $V_d$ by a gain $K_{va1}$, and limiting the resultant value so that its absolute value does not exceed an acceleration limit value $A_{max1}$. Further, an acceleration instruction $A_2$ is determined by multiplying $V_d$ by a gain $K_{va2}$ and limiting the resultant value so that its absolute value does not exceed an acceleration limit value $A_{max2}$.

An acceleration/deceleration decision unit 42 compares the signs of the speed deviation $V_d$ and speed instruction $V_2$. When they have the same signs, i.e., when the absolute value of the speed instruction $V_2$ is to be increased, a mode selection unit 45 selects the acceleration instruction $A_1$. On the other hand, when $V_d$ and $V_2$ have opposite signs, i.e., when the absolute value of the speed instruction $V_2$ is to be reduced, the acceleration instruction $A_2$ is selected. The selected acceleration instruction $A_3$ is integrated by an integrator 46 to output the integrated value as the speed instruction $V_2$.

As the speed instruction $V_2$ is determined by integrating the deviation between the speed instruction $V_2$ and the target speed $V_1$, the speed instruction $V_2$ follows $V_1$. The speed V of the walking aid apparatus 1 is controlled so as to coincide with the speed instruction $V_2$. As the speed instruction $V_2$ is obtained by integrating the acceleration instruction $A_3$ the speed V coincides with the integration of the acceleration instruction $A_3$. That is, the acceleration instruction $A_3$ coincides with the acceleration A of the walking aid apparatus 1.

Although the gains $K_{va1}$ and $K_{va2}$ and the acceleration limit values $A_{max1}$ and $A_{max2}$ are determined according to the walking ability of the user 2, the parameters $K_{va1}$ and $A_{max1}$ for acceleration are set smaller than the parameters $K_{va2}$ and $A_{max2}$ for deceleration.

Figure 7:
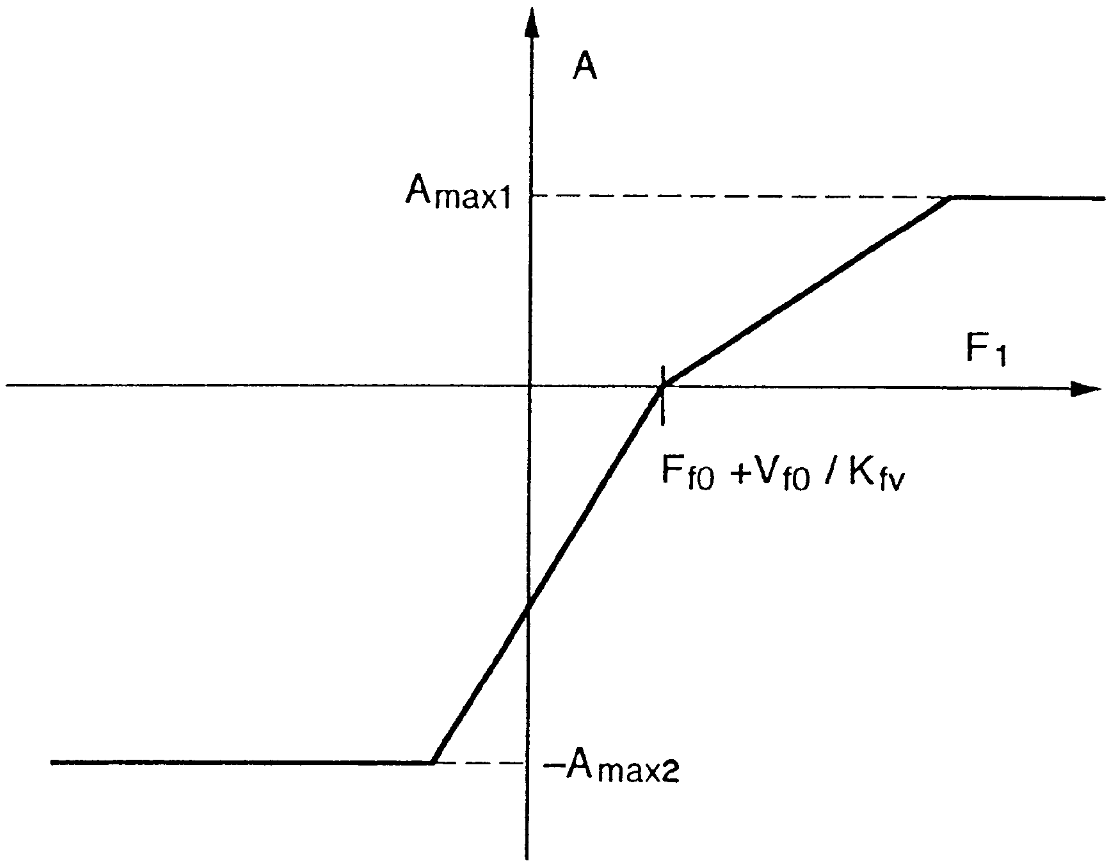
FIG. 7 is a graph showing an example relationship between an operation force and an acceleration of walking aid apparatus according to the present invention.

FIG. 7 shows the relation between the operation force $F_1$ and the acceleration instruction $A_3$ i.e., the relation between the operation force $F_1$ and the acceleration A of the walking aid apparatus 1, when the speed instruction $V_2$ is a certain positive value $V_{20}$, i.e., the walking aid apparatus 1 is moving forward at the speed $V_{20}$.

As the gain $K_{va1}$ is set smaller than $K_{va2}$, the inclination of the graph changes depending on the sign of the acceleration A. The change rate of the acceleration A with respect to the change in the operation force $F_1$ when the acceleration A becomes positive, i.e., the apparatus is accelerated is smaller than that when the apparatus is decelerated.

When the user 2 pushes the walking aid apparatus 1 forward, a positive operation force $F_1$ is detected. If $F_1$ is equal to $F_{f0}+V_{20}/K_{fv}$, the target speed value $V_1$ becomes equal to $V_{20}$ by the action of the friction generation unit 22 and the speed control unit 23, so that the speed deviation $V_d$ becomes "0" and the acceleration instruction $A_3$ becomes "0". Hence, the walking aid apparatus 1 continues to move forward at a constant speed of $V_{20}$.

When the user 2 increases the force with which he pushes the walking aid apparatus 1, the operation force $F_1$ is increased, so that the speed deviation $V_d$ becomes positive. As a result, the acceleration instruction $A_1$ is selected, so that the acceleration instruction $A_3$ becomes positive value $K_{va1} \cdot V_d$. Hence, the walking aid apparatus 1 increases its speed with acceleration $K_{va1} \cdot V_d$. When the operation force $F_1$ further increases, the acceleration A of the walking aid apparatus 1 further increases. However, the change rate of the acceleration is smaller than when the acceleration A is negative. The magnitude of the acceleration A is limited so that it does not exceed the acceleration limit value $A_{max1}$.

On the other hand, when the user 2 either reduces the force with which he is pushing the walking aid apparatus 1 or pulls back the walking aid apparatus 1 to reduce the operation force $F_1$, the speed deviation $V_d$ becomes negative. As a result, the acceleration instruction $A_2$ is selected, so that the acceleration instruction $A_3$ becomes $k_{va2} \cdot V_d$. Hence, the walking aid apparatus 1 decelerates due to the negative acceleration $K_{va2} \cdot V_d$. When the operation force $F_1$ further decreases, the acceleration A of the walking aid apparatus 1 becomes a larger negative value, but its change rate is greater than when the acceleration A is positive. The absolute value of the acceleration instruction $A_3$ is limited so that it does not exceed $A_{max2}$.

As the acceleration A of the walking aid apparatus is controlled as described above, even when the user 2 stumbles and applies a strong forward force to the walking aid apparatus 1, the walking aid apparatus 1 is prevented from accelerating suddenly. Thus, the possibility of the user 2 being left behind the walking aid apparatus 1 is eliminated, and the risk of his falling down can be reduced. On the other hand, when the user 2 leaves the walking aid apparatus 1 and the operation force $F_1$ becomes "0" or when the user 2 applies a backward force to stop the walking aid apparatus 1, a sufficiently large negative acceleration is generated. Thus, it is possible to quickly stop the walking aid apparatus 1. Further, as the magnitude of the negative acceleration is limited by the acceleration limit value $A_{max2}$, the user 2 can be prevented from clashing against the walking aid apparatus 1.

The acceleration limit value $A_{max1}$ during acceleration is set at a small value in such a range that the user 2 will not feel uncomfortable handling the apparatus. It should preferably be set to 1 m/s or less. The acceleration limit value $A_{max2}$ during deceleration is set so that the walking aid apparatus can be stopped safely and swiftly. It should preferably be set in a range from 1 m/s to 5 m/s.

Figure 8:
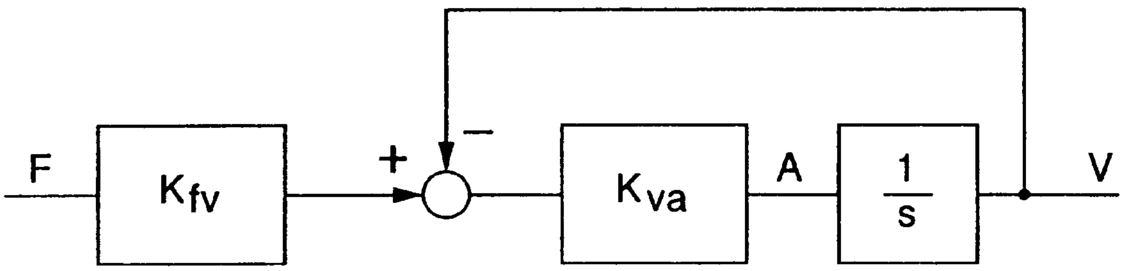
FIG. 8 is a block diagram showing an example of the characteristic of a walking aid apparatus according to the present invention.

The characteristic of the walking aid apparatus according to the present invention is represented by a block diagram of FIG. 8. This diagram shows only the effects of the speed control unit 23 and the acceleration control unit 24, and not the influences of the speed limit value and the acceleration limit value. The gain $K_{va}$ is switched to $K_{va1}$ during acceleration and to $K_{va2}$ during deceleration. From the block diagram, the transfer function of the pushing force F acting on the walking aid apparatus 1 and the speed V of the apparatus 1 is determined as follows.

$$H(s)=1/\{s/(K_{fv} \cdot K_{va})+1/K_{fv}\} \tag{18}$$

Generally, the transfer function of a system having an inertia M and a viscous resistance L is given by 1/(Ms +L). When it is compared with the above equation, we obtain the following equation.

$$M=1/(K_{fv} \cdot K_{va}),\ L=1/K_{fv} \tag{19}$$

That is, by setting the gains $K_{fv}$ and $K_{va}$, it is possible to freely set the apparent inertia and viscosity of the walking aid apparatus 1. The apparent inertia M changes to $Ma^1$ during acceleration and to $Ma^2$ during deceleration because the gain $K_{va}$ assumes different values at acceleration and at deceleration.

When the apparent viscosity L is too small, the walking aid apparatus 1 moves too easily and becomes unstable. When the apparent viscosity L is too large, the force required to push the apparatus becomes large. Hence, L should-be set at an appropriate value according to the walking ability of the user. It should preferably be set in a range of 20 Ns/m to 500 Ns/m. Therefore, the gain $K_{fv}$ is preferably set in a range of 0.002 m/sN to 0.05 m/sN.

In order to prevent sudden acceleration, the apparent inertia $Ma^1$ during acceleration should preferably be set large in a range that will not make the user 2 feel uncomfortable handing the apparatus. It should be preferably set in a range of 50 kg to 200 kg.

The apparent inertia $Ma^2$ during deceleration should preferably be set smaller than $Ma^1$ so that the apparatus can be stopped swiftly. It should be preferably set to 0.6 or less times $Ma^1$. $K_{va1}$ and $K_{va2}$ are set based on $K_{fv}$, $Ma^1$ and $Ma^2$.

The attenuation time constant T for the speed V of the walking aid apparatus 1 when the user 2 leaves the walking aid apparatus 1 can be expressed as M/L, which is $1/K_{va}$. In order to attenuate the speed V swiftly, the smaller the time constant T, the better. It should be preferably set to 2 seconds or less. Therefore, $K_{va}$ should be preferably set at 0.5 [1/s] or more.

The reversing limit unit 25 prevents the user 2 from falling down due to his contact with the walking aid apparatus 1. When the walking aid apparatus 1 contacts the front part of the user while moving back, the user will grip the support unit 4 to avoid falling. This generates the backward operation force $F_1$. When the walking aid apparatus 1 moves further back, it is probable that the user 2 may fall. When the speed instruction $V_2$ is negative, i.e., the backward speed instruction is being applied, and when the proximity sensor 9 detects that the user 2 contacts or comes close to other than the support unit 4 of the walking aid apparatus 1, the reversing limit unit 25 sets the motor speed instruction $V_3$ to "0", to stop the walking aid apparatus. This prevents the falling of the user 2.

As the legs of the user 2 in particular are likely to contact the walking aid apparatus, the proximity sensor 9 is preferably attached to the lower inner side of the walking aid apparatus 1 to detect the approaching legs of the user 2. The proximity sensor 9 may use, for example, a contact type touch sensor, a beam interruption detection sensor, an optical measuring type sensor, an ultrasonic distance sensor, and so forth.

The above embodiment describes the longitudinal motion of the walking aid apparatus 1. However, it is possible to perform the similar control on a rotary motion by detecting a moment about a vertical axis rather than the longitudinal force and by driving the left and right motors in opposite directions rather than driving them in the same directions.

In above embodiment, the motor controller 55 uses a speed control type motor controller which compares the speed instruction 56 given by the calculation unit 51 with the motor speed detected by the speed sensor 8 and performs a speed feedback to control the motor speed. However, it is possible to use a torque command type motor controller that controls the torque of the motor according to the torque command. In that case, the calculation unit 51 performs a speed feedback calculation to determine the required torque and sends the torque command to the motor controller.

When the torque command type motor controller is used, it is also possible to calculate according to the inclination angle detected by the inclination sensor 10 a torque required to cancel the influences of the gravity acting on the walking aid apparatus 1 and the vertical force applied from the user 2 to the walking aid apparatus 1, and then to add it to the torque command.

With this method, the necessary torque can be produced without time delay compared with a case where the inner integral element of the speed control type motor controller generates a torque for canceling the influences of external forces.

In the above embodiment, the motor 7 controls the speed and acceleration of the walking aid apparatus 1. However, a controllable brake such as an electromagnetic brake may be used instead of the motor. When the brake is used, an aiding torque for moving up a slope cannot be provided, but it is possible to prevent with lower cost the movement of the apparatus down the slope and excess speed.

Further, to realize an inexpensive construction, a mechanism such as a brake using a viscous fluid which produces resistance according to the speed may be attached to the wheels 5 in order to realize the relation between the force and the speed as shown in FIG. 5.

What is claimed is:

1. A walking aid apparatus which aids a user in walking, comprising:

a movable body having a support unit which supports the walking user for walking movement of the user;

a drive which enables movement of the movable body;

a controller which controls movement of the movable body by control of the drive; and a speed detector which detects the speed of movement of the movable body;

the controller controlling the speed of the movable body at least in accordance with an output of the speed detector and reducing a change rate of the speed of movement of the movable body with respect to a change in force acting on the support unit which supports the walking user for walking movement when the speed of movement of the movable body increases.

2. A walking aid apparatus according to claim 1, wherein the support unit which supports the walking user includes a portion engagable by hands of the user which provide support for the walking user.

3. A walking aid apparatus according to claim 1, further comprising a resistance generator which reduces the speed of movement of said movable body.

4. A walking aid apparatus according to claim 1, wherein an absolute value of an increment of a velocity in acceleration of said movable body is smaller than an absolute value of a decrement of a velocity in deceleration of the movable body when the same force is applied to the support unit by the user in the acceleration and deceleration of the movable body.

5. A walking aid apparatus according to claim 1, wherein the controller controls said movable body to stay at a position thereof when a vertical force is applied to the movable body on a slope without a horizontal force.

6. A walking aid apparatus according to claim 1, further comprising a proximity sensor which detects an object approaching the movable body, the controller stopping movement of the movable body when the proximity sensor detects the object within a predetermined distance.

7. A walking aid apparatus which aids a user in waking, comprising:

a movable body having a support unit which supports the walking user for walking movement of the user;

a drive which enables movement of the movable body;

a controller which controls movement of the movable body using the drive;

a force detector which detects a force acting on the support unit by the user; and a speed detector which detects the speed of movement of the movable body;

the controller controlling the speed of movement of the movable body based on detection results of the speed detector and the force detector and decreasing a change rate of the speed of movement of the movable body with respect to a change in force acting on the support unit when the speed of movement of the movable body increases.

8. A walking aid apparatus according to claim 7, wherein the support unit which supports the walking user includes a portion engagable by hands of the user which provide support for the walking user.

9. A walking aid apparatus according to claim 7, further comprising a resistance generator which reduces the speed of movement of the movable body.

10. A walking aid apparatus according to claim 7, wherein the controller controls a change rate of an acceleration of the movable body with respect to a change in the detected result of force detected by the force detector, and wherein the change rate of the speed of the moveable body with respect to controller decreases the change in force acting on said support unit in acceleration of the movable body as compared with a deceleration of said movable body.

11. A walking aid apparatus according to claim 7, wherein an absolute value of an increment of a velocity in acceleration of the movable body is smaller than an absolute value of a decrement of a velocity in deceleration of the movable body when the same force is applied to the support unit by the user in the acceleration and deceleration of the movable body.

12. A walking aid apparatus according to claim 7, wherein the controller controls the movable body to stay at a position thereof when a vertical force is applied to the movable body on a slope without a horizontal force.

13. A walking aid apparatus according to claim 7, further comprising a proximity sensor which detects an object approaching the movable body, the controller stopping movement of the movable body when the proximity sensor detects the object within a predetermined distance.

* * * * *